(12) United States Patent
Brand et al.

(10) Patent No.: US 12,404,793 B1
(45) Date of Patent: Sep. 2, 2025

(54) DUAL FUNCTION CATALYST PREHEATING AND EGR SYSTEM

(71) Applicant: FCA US LLC, Auburn Hills, MI (US)

(72) Inventors: Jeff Brand, Auburn Hills, MI (US); Ryan M Sturgeon, Auburn Hills, MI (US); John D Frederick, Auburn Hills, MI (US); Kenneth E Hardman, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/922,741

(22) Filed: Oct. 22, 2024

(51) Int. Cl.
| | |
|---|---|
| *F02B 37/10* | (2006.01) |
| *F01N 3/20* | (2006.01) |
| *F01N 3/22* | (2006.01) |
| *F01N 3/30* | (2006.01) |
| *F02B 37/18* | (2006.01) |
| *F02D 23/00* | (2006.01) |
| *F02M 26/05* | (2016.01) |
| *F02B 39/10* | (2006.01) |

(52) U.S. Cl.
CPC ............... *F01N 3/225* (2013.01); *F01N 3/20* (2013.01); *F01N 3/306* (2013.01); *F02B 37/10* (2013.01); *F02B 37/183* (2013.01); *F02D 23/00* (2013.01); *F02M 26/05* (2016.02); *F01N 2340/06* (2013.01); *F01N 2550/14* (2013.01); *F02B 39/10* (2013.01)

(58) Field of Classification Search
CPC .. F02B 37/04; F02B 37/10; F02B 37/18–183; F02B 39/04; F02B 39/10; F01N 3/30; F01N 3/306; F01N 3/225; F01N 2550/14; F01N 2340/06
See application file for complete search history.

(56) References Cited

U.S. PATENT DOCUMENTS

| | | | |
|---|---|---|---|
| 11,519,313 B1 * | 12/2022 | Martz | F01N 9/00 |
| 11,585,257 B1 * | 2/2023 | Nejedly | F04D 27/0215 |

(Continued)

FOREIGN PATENT DOCUMENTS

| | | | |
|---|---|---|---|
| DE | 102016214486 A1 * | 2/2018 | |
| DE | 102018212193 A1 * | 1/2020 | |

(Continued)

*Primary Examiner* — Ngoc T Nguyen
(74) *Attorney, Agent, or Firm* — Jeremy J. Klobucar

(57) ABSTRACT

An internal combustion engine system includes an internal combustion engine, an air intake conduit, an exhaust system with a catalytic converter, a combined catalyst preheating/ exhaust gas recirculation (EGR) system with a recirculation passage, a heating element, and a preheating/EGR valve configured to selectively allow flow through the recirculation passage, and an electric turbocharger assembly including a compressor and a turbine rotatably coupled by a shaft. A controller is configured to operate in (i) a catalyst preheating mode where the preheating/EGR valve is opened to allow intake air into the recirculation passage, and the electric turbocharger compressor is operated to force intake air through the recirculation passage and the heating element to rapidly heat the catalytic converter, and (ii) an EGR mode where the throttle is opened to allow intake air to flow into the engine, and the preheating/EGR valve is opened to allow exhaust gas into the recirculation passage.

19 Claims, 4 Drawing Sheets

(56) References Cited

U.S. PATENT DOCUMENTS

| | | | |
|---|---|---|---|
| 2011/0146274 A1* | 6/2011 | Shimizu | B01D 46/42 |
| | | | 60/274 |
| 2020/0271046 A1* | 8/2020 | Kelly | F02B 37/10 |
| 2023/0059437 A1* | 2/2023 | Yang | F01N 3/006 |

FOREIGN PATENT DOCUMENTS

| | | | | |
|---|---|---|---|---|
| DE | 102021117857 A1 * | 1/2023 | | |
| DE | 102022101822 A1 * | 7/2023 | | B60K 25/00 |
| EP | 4008887 A1 * | 6/2022 | | F01D 9/026 |

* cited by examiner

DUAL FUNCTION CATALYST PREHEATING AND EGR SYSTEM

FIELD

The present application relates generally to internal combustion engine systems and, more particularly, to electrified vehicles with an internal combustion engine having a catalyst preheating and exhaust gas recirculation system.

BACKGROUND

Some electrified vehicles also include an internal combustion engine, for example, to facilitate recharging a high voltage (HV) battery system that powers one or more electric traction motors that drive the vehicle. However, because the engine is used intermittently, it is difficult to achieve low tailpipe emissions in the time immediately following a cold engine start due to low catalyst conversion efficiency of cold catalysts. In order to achieve acceptable conversion efficiency, the catalyst must surpass a predetermined light-off temperature. Thus, while such conventional systems do work well for their intended purpose, it is desirable to provide continuous improvement in the relevant art.

SUMMARY

In accordance with one example aspect of the invention, an internal combustion engine system is provided. In one example implementation, the engine system includes an internal combustion engine, an air intake conduit configured to receive intake air, an exhaust system with a main exhaust conduit and a main catalytic converter configured to receive exhaust gas from the internal combustion engine, a combined catalyst preheating/exhaust gas recirculation (EGR) system with a recirculation passage, a heating element, and a preheating/EGR valve configured to selectively allow flow through the recirculation passage, and an electric turbocharger assembly including a compressor and a turbine rotatably coupled by a shaft.

A controller includes one or more processors and a non-transitory computer-readable storage medium having a plurality of instructions stored thereon, which, when executed by the one or more processors, cause the one or more processors to perform operations comprising: (i) operating in a catalyst preheating mode, including opening the preheating/EGR valve to allow intake air into the recirculation passage, and operating the electric turbocharger compressor to force intake air through the recirculation passage to the main exhaust conduit, and through the heating element to rapidly heat the main catalytic converter to a predetermined light-off temperature; and (ii) operating in an EGR mode, including: opening the throttle to allow intake air to flow into the engine, opening the preheating/EGR valve to allow exhaust gas into the recirculation passage, and operating the internal combustion engine system to create a pressure differential to draw exhaust gas into the recirculation passage and recirculate the exhaust gas to the air intake conduit.

In addition to the foregoing, the described engine system may include one or more of the following features: wherein the recirculation passage includes a first end fluidly coupled to the air intake conduit in a location downstream of the compressor, and an opposite second end fluidly coupled to the main exhaust conduit in a location upstream of the turbine; wherein the preheating/EGR valve is located at the recirculation passage first end; and wherein in the catalyst preheating mode, the intake air flows through the recirculation passage in a first direction, and wherein in the EGR mode, the exhaust gas flows through the recirculation passage in a second direction that is opposite the first direction.

In addition to the foregoing, the described engine system may include one or more of the following features: wherein the electric turbocharger is powered by a battery system of the electrified vehicle; wherein the heating element is disposed within the recirculation passage; wherein the heating element is part of an electrically heated catalyst (EHC) disposed within the main exhaust conduit; wherein the heating element includes a first heating element disposed within the recirculation passage, and a second heating element disposed within the main exhaust conduit; wherein the catalyst preheating mode is performed while the engine is off; and wherein the controller is further configured to operate in a normal operation mode, including (i) opening the throttle to allow intake air to flow into the engine, (ii) closing the preheating/EGR valve to prevent fluid flow into the recirculation passage, and (iii) operating the electric turbocharger assembly to compress intake air.

In accordance with another example aspect of the invention, a method of operating an internal combustion engine system is provided. In one example implementation, the engine system includes an internal combustion engine, an air intake conduit configured to receive intake air, an exhaust system with a main exhaust conduit and a main catalytic converter configured to receive exhaust gas from the internal combustion engine, an electric turbocharger assembly including a compressor and a turbine rotatably coupled by a shaft, and a combined catalyst preheating/exhaust gas recirculation (EGR) system with a recirculation passage, a heating element, and a preheating/EGR valve configured to selectively allow flow through the recirculation passage.

In one example implementation, the method includes (i) operating in a catalyst preheating mode, comprising: opening, by a controller having one or more processors, the preheating/EGR valve to allow intake air into the recirculation passage; and operating, by the controller, the electric turbocharger compressor to force intake air through the recirculation passage to the main exhaust conduit, and through the heating element to rapidly heat the main catalytic converter to a predetermined light-off temperature, and (ii) operating in an EGR mode, comprising: opening, by the controller, a throttle to allow intake air to flow into the engine; opening, by the controller, the preheating/EGR valve to allow exhaust gas into the recirculation passage; and operating the internal combustion engine system to create a pressure differential to draw exhaust gas into the recirculation passage and recirculate the exhaust gas to the air intake conduit.

In addition to the foregoing, the described method may include one or more of the following features: wherein the recirculation passage includes a first end fluidly coupled to the air intake conduit in a location downstream of the compressor, and an opposite second end fluidly coupled to the main exhaust conduit in a location upstream of the turbine; wherein the preheating/EGR valve is located at the recirculation passage first end; and wherein in the catalyst preheating mode, the intake air flows through the recirculation passage in a first direction, and wherein in the EGR mode, the exhaust gas flows through the recirculation passage in a second direction that is opposite the first direction.

In addition to the foregoing, the described method may include one or more of the following features: wherein the electric turbocharger is powered by a battery system of the electrified vehicle; wherein the heating element is disposed within the recirculation passage; wherein the heating element is part of an electrically heated catalyst (EHC) disposed within the main exhaust conduit; wherein the heating element includes a first heating element disposed within the recirculation passage, and a second heating element disposed within the main exhaust conduit; wherein the catalyst preheating mode is performed while the engine is off; and operating in a normal operation mode, including (i) opening, by the controller, the throttle to allow intake air to flow into the engine, (ii) closing, by the controller, the preheating/EGR valve to prevent fluid flow into the recirculation passage, and (iii) operating the electric turbocharger assembly to compress intake air.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

Figure 1:
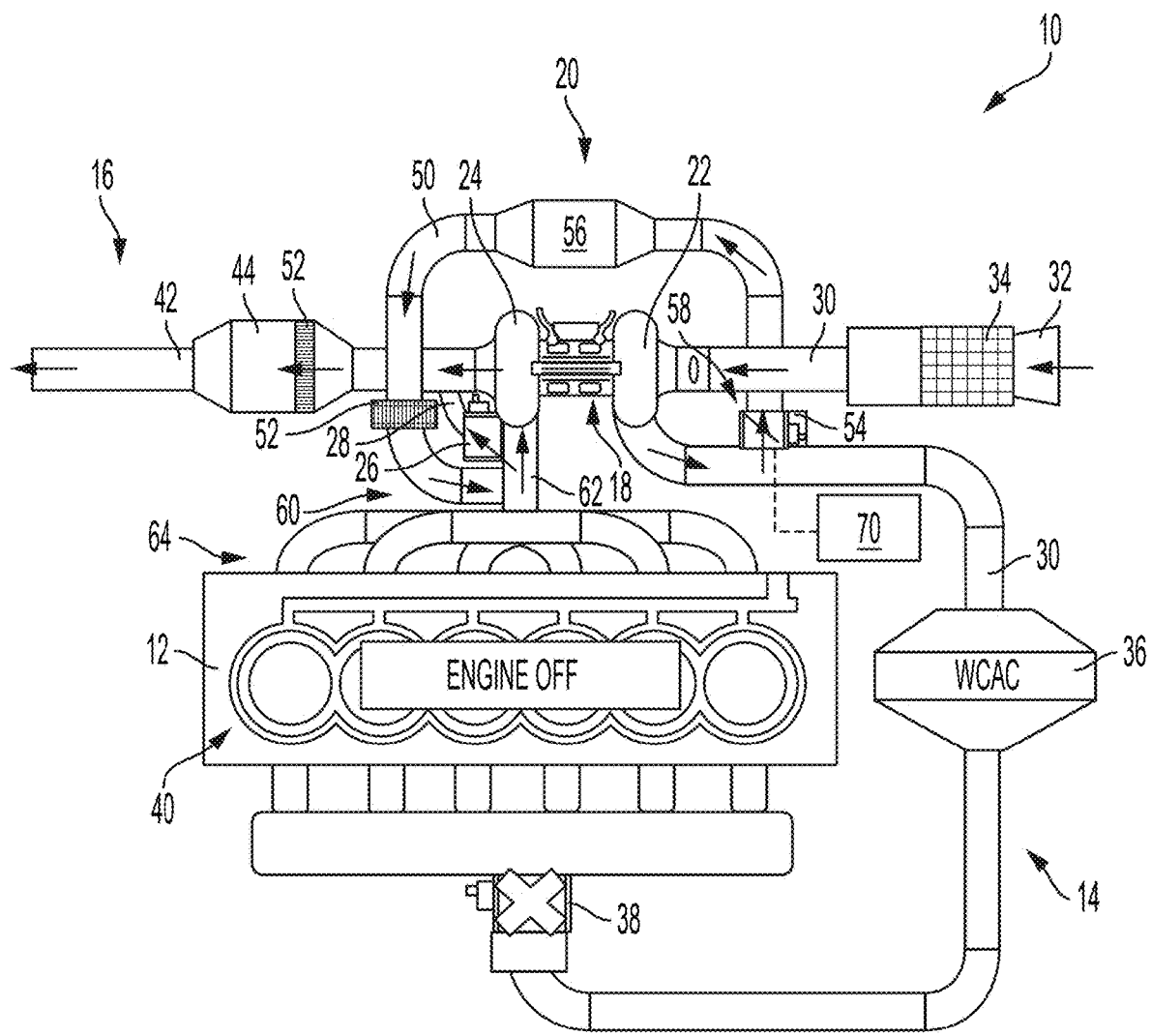
FIG. 1 is a schematic diagram of an example combined catalyst preheating/EGR system operating in a first mode, in accordance with the principles of the present application.

As previously described, some vehicles include both an electrified powertrain as well as an internal combustion engine. Example vehicles include mild hybrid electric vehicles (mHEVs), plug-in hybrid electric vehicles (PHEVs), hybrid electric vehicles (HEVs), and range extended electric vehicles (REEVs). However, the engine is only turned on at specific times, for example, when charging the HV battery system that powers one or more electric traction motors. Some conventional engine aftertreatment systems have limited or no capacity to get the catalyst to a light-off temperature for efficient conversion of harmful exhaust constituents before approximately fifteen seconds post cold start in a turbocharged system. Every second the engine is running and the catalyst is not at or above light-off temperature, CO, HC, and NOx are not being converted efficiently. The short time preceding the catalyst light-off is responsible for a very large portion of the CO, HC, and NOx breakthrough for on and off cycle starts and long idles. In conventional systems, one or more catalysts are traditionally located some distance downstream of the exhaust outlet of the cylinder head and/or turbocharger outlet and are typically in the main exhaust flow for the entire useful life of the vehicle.

Moreover, in hybrid applications, the engine may not start for some time after the vehicle starts moving and can also have subsequent engine restarts. Large emissions challenges can arise in scenarios where the catalysts are not warm when the engine needs to start. These restarts and cold starts have a fuel, battery energy, and emissions cost in addition to negative range and MPG impacts. Further, it may be challenging to get low tailpipe emissions (high catalyst conversion efficiency) in the time immediately following engine starts without large compromises. This issue is especially prevalent in hybridized applications that can have engine starts (cold or warm) while the vehicle is in motion because the engine often needs to prioritize driver demand, which can increase engine-out emissions.

Accordingly, described herein are systems and methods for a catalyst preheating system advantageously combined with an exhaust gas recirculation (EGR) system. The system enables two different emissions/efficiency functions (i.e., catalyst preheating and EGR) to utilize shared hardware (e.g., plumbing, valves, actuators, etc.) for functional, packaging, and cost benefits on electrified turbocharger (E-turbo) enabled powertrains. The system is intended for HV electric systems (e.g., 48V or higher), but may find uses in other types of system.

In one example, the system utilizes the turbocharger compressor as a pump to move air from the post-compressor location to the pre-turbine location to function as a catalyst preheating pathway for a cold start operation, and then to "re-use" this pathway in reverse to flow exhaust gas from the pre-turbine location back to the post-compressor location to be used for high pressure EGR.

Accordingly, the system described herein is implemented on HV vehicle electrical systems, such as mHEV, PHEV, HEV, and REEV architectures that utilize an electric turbocharger, an EGR system, and a catalyst preheating system with a heating element, such as an electrically heated catalyst (EHC). An electrically actuated preheat/EGR valve and wastegate are utilized in combination with the E-turbo and engine control to drive airflow to the EHC during preheating before a cold start, and then subsequently use the same flow path in reverse to flow hot EGR gas from the pre-turbine location to the post-compressor location, with an EGR cooler (if required).

During a cold engine startup event or other scenarios where it is desirable to activate the EHC while the engine is off, the preheat/EGR valve is opened, the engine throttle is closed, and the E-turbo is controlled to rotate and drive ambient intake air through the EGR system. The driven intake air passes through the preheat/EGR valve, the EGR cooler (if present), a standalone heating element (if present), the turbine volute (or exhaust manifold), the open wastegate (if present), and finally through the EHC/catalyst to transfer heat to the catalyst before exiting the tailpipe. As such, the system advantageously utilizes the same pathway for both catalyst preheating during cold catalyst conditions, and when high pressure EGR is desired for fuel economy and/or knock margin benefits, without the need for a separate (and single function) EGR plumbing and valve system or dedicated air pump system.

The described system advantageously synergistically enables most of the hardware and packaging space to be shared for both the catalyst preheating system and EGR system, by allowing the air/exhaust gas transportation and flow metering hardware to function in two directions with thoughtful selection of inlet/outlet locations, valve solutions, and control/diagnostics. The system removes the need for a dedicated EGR and catalyst system hardware.

With initial reference to FIG. 1, an internal combustion engine system 10 for an electrified vehicle is illustrated in accordance with the principles of the present application. Although not shown, the electrified vehicle includes an electrified powertrain and a HV battery system configured to drive one or more electric traction motors, as is known in the art. The electrified vehicle is a hybrid electric vehicle such as, for example, a mHEV, PHEV, HEV, or REEV.

In the example embodiment, the engine system 10 generally includes an engine 12, an air intake system 14, an exhaust system 16, a turbocharger assembly 18, and a combined catalyst preheating/EGR system 20. As described herein in more detail, the combined catalyst preheating/EGR system 20 is configured to be operated in a catalyst preheating mode and an EGR mode. The catalyst preheating mode is selectively utilized during cold start, long idle, and/or cold catalyst conditions to rapidly heat to light-off temperatures to quickly achieve low tailpipe emissions. The EGR mode is selectively utilized during engine operation to improve engine performance and reduce emissions.

The turbocharger assembly 18 is operated by an electric motor powered by the electrified vehicle HV battery system (not shown), and may also be referred to as an e-turbo assembly 18. The e-turbo assembly 18 includes a compressor 22, which is rotatably coupled to a turbine 24 via a shaft (not shown). The compressor 22 is configured to compress intake air and includes an inlet configured to receive ambient air, and an outlet in fluid communication with the engine 12. The turbine 24 is configured to utilize exhaust gas from the engine 12 to rotate the compressor 22 and includes an exhaust inlet configured to receive exhaust gas from the engine 12, and an exhaust outlet fluidly coupled to the exhaust system 16. In some embodiments, the e-turbo assembly 18 also includes a wastegate valve 26 that selectively allows exhaust gas to bypass the turbine 24 via a wastegate passage 28.

With continued reference to FIG. 1, the air intake system 14 includes an air intake conduit 30 having an air inlet 32 configured to receive fresh air, an air filter 34, a charge air cooler (CAC) 36, and a throttle 38. Air intake conduit 30 provides intake air to the turbocharger compressor 22, which compresses the intake air. The compressed air is then directed to the CAC 36, where it is cooled (e.g., via water, air, etc.) and subsequently directed to the engine 12. The throttle 38 is configured to selectively move between open and closed positions to regulate the amount of air and/or fuel supplied to cylinders 40 of the engine. Air and fuel are combusted in the cylinders 40 to produce engine power and the resulting combustion byproduct, exhaust gas, is then directed to the exhaust system 16 via the turbocharger turbine 24 and/or the wastegate passage 28.

The exhaust system 16 generally includes a main exhaust conduit 42 having one or more catalytic converters 44 to reduce or convert a desired exhaust gas constituent such as, for example, carbon monoxide (CO), hydrocarbon (HC), and/or nitrogen oxides (NOx). The main exhaust conduit 42 is fluidly coupled to the turbocharger turbine 24 and is configured to receive exhaust gas from the vehicle engine 12 and supply the exhaust gas to the main catalytic converter 44. To efficiently reduce or convert CO, HC, and NOx, the main catalytic converter 44 must reach a predetermined light-off temperature. However, during some vehicle operations such as cold starts, the main catalytic converter 44 is below light-off temperature and therefore has a low catalyst conversion efficiency.

Accordingly, in order to efficiently reduce or convert the unwanted exhaust gas constituents while the main catalytic converter 44 is below the light-off temperature, the vehicle utilizes the catalyst preheating/EGR system 20, which generally includes a recirculation passage 50, a heating element 52 (e.g., EHC), one or more preheat/EGR valves 54, and optionally a heat exchanger or EGR cooler 56. The e-turbo assembly 18 electric motor is utilized to drive flow through recirculation passage 50, as described herein in more detail.

The recirculation passage 50 includes a first end 58 and an opposite second end 60. The first end 58 is fluidly coupled to the air intake conduit 30 in a location downstream of the compressor 22, and the second end 60 fluidly coupled to an exhaust outlet duct 62 in a location between an engine exhaust manifold 64 and both the turbine 24 and the wastegate passage 28. The heating element 52 may be a standalone heating element disposed within the recirculation passage. Additionally, or alternatively, the heating element 52 may be included with main catalytic converter 44, which may be referred to as an EHC. In the example embodiment, the preheat/EGR valve 54 is located at the passage first end 58, but it will be appreciated that it may be positioned in any suitable location that enables combined system 20 to function as described herein. The EGR cooler 56 may be utilized (when present) to heat/cool fluid passing through recirculation passage 50.

A controller 70 (e.g., engine control unit) is in signal communication with the e-turbo assembly 18, the wastegate valve 26, the throttle 38, and the preheat/EGR valve 54. The controller 70 is configured to selectively rotate the e-turbo assembly 18 in a first (normal) direction where compressor 22 compresses intake air. The controller 70 is also configured to selectively move the valves 26, 38, 54 to any position between a fully open first position and a fully closed second position. In the first position, wastegate valve 26 allows exhaust gas to flow through wastegate passage 28, throttle 38 allows intake air into the engine 12, and preheat/EGR valve 54 allows fluid flow through recirculation passage 50. In the second position, wastegate valve 26 prevents exhaust gas flow through the wastegate passage 28, throttle 38 prevents intake air from flowing into engine 12, and preheat/EGR valve 54 prevents fluid flow through recirculation passage 50. Although illustrated in the example implementation as a butterfly valve, it will be appreciated that valves 26, 38, 54 may be any suitable valve that enables engine system 10 to operate as described herein.

In the example embodiment, the combined catalyst preheating/EGR system 20 is configured to selectively operate in (i) a normal or warm catalyst mode, (ii) a cold catalyst preheating mode, and (iii) an EGR mode. In the warm catalyst mode, controller 70 determines the main catalytic converter 44 has reached the predetermined light-off temperature (e.g., via temperature sensor, modeled, etc.) and moves the preheat/EGR valve 54 to the fully closed position and operates the e-turbo assembly 18, wastegate valve 26, and throttle 38 normally. In this mode, the closed preheat/EGR valve 54 facilitates preventing intake air and exhaust gas from entering the recirculation passage 50.

In the cold catalyst mode, controller 70 determines the main catalytic converter 44 is below the predetermined light-off temperature (e.g., a cold start), and subsequently moves the wastegate valve 26 to the open position, the throttle 38 to the closed position, and the preheat/EGR valve 54 to the fully open position. This may occur while the engine 12 is off and when conditions indicate the engine 12 will soon be turned on. The controller 70 also activates the e-turbo assembly 18 and the heating element(s) 52.

In this mode, the compressor 22 is rotated such that air in the air intake conduit 30 is compressed. Because the throttle 38 is closed and the preheat/EGR valve 54 is open, the compressed air is directed through the recirculation passage 50 and heated by the heating element 52 disposed therein (if present), as shown by the arrows. The heated air is then directed through the turbine 24 and/or the wastegate passage 28 and is subsequently heated by the EHC heating element 52 (if present). Rotation of the turbine 24 may also support drawing intake air through the recirculation passage 50, and then through exhaust conduit 42. As such, the heated air rapidly heats the main catalytic converter 44 to the predetermined light-off temperature or a temperature closer thereto. Once light-off or a desired amount of heating is achieved, they system 20 may be returned to the normal mode and the engine 12 may be started. In some operations, for example if light-off temperature is not achieved before the engine 12 is started, the system 20 may continue to operate in the cold catalyst mode to provide additional heating until the light-off temperature is achieved.

Figure 2:
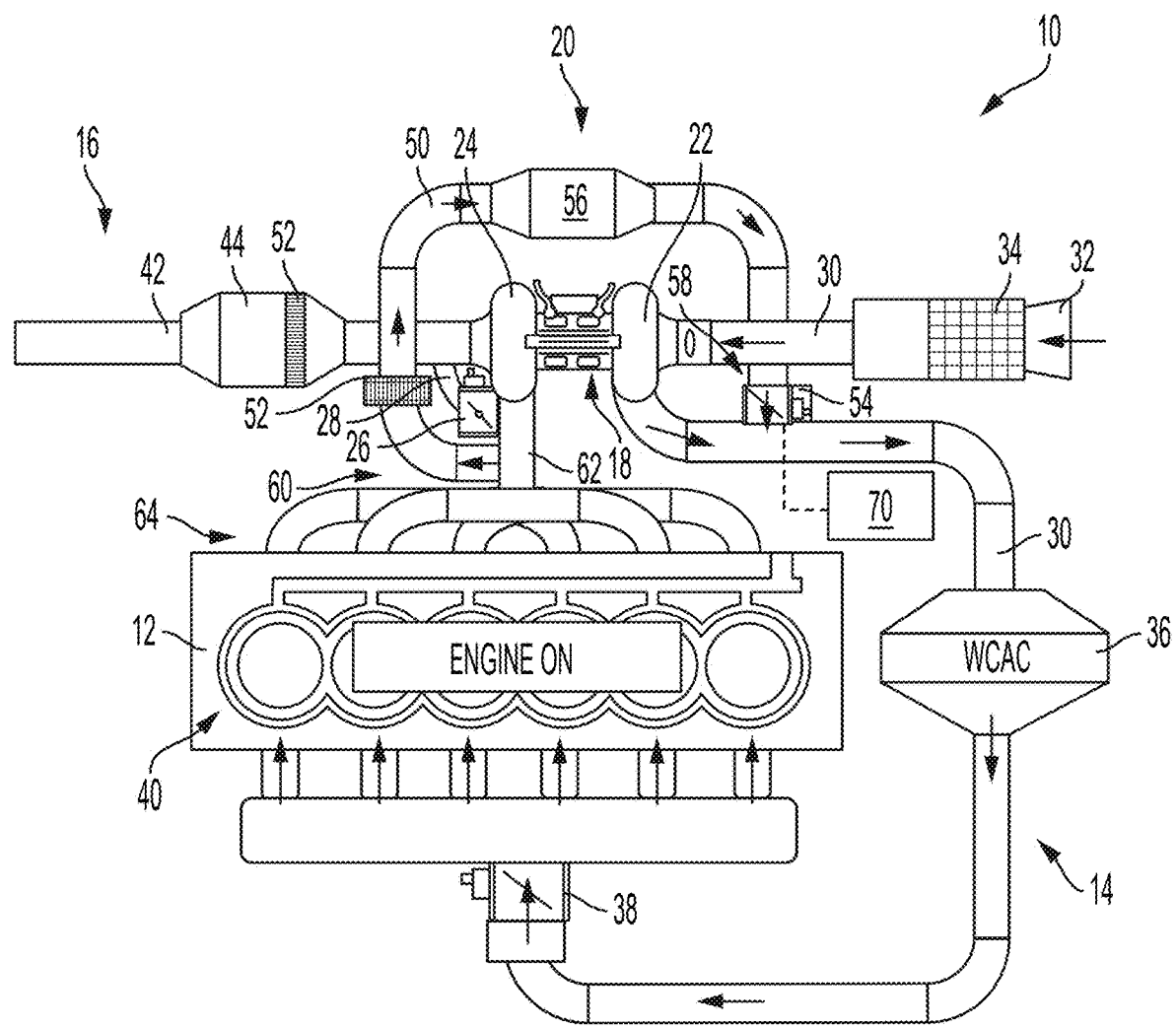
FIG. 2 is a schematic diagram of the combined catalyst preheating/EGR system operating in a second mode, in accordance with the principles of the present application.

With additional reference to FIG. 2, in the EGR mode, controller 70 moves the throttle 38 to at least a partially open position, and the preheat/EGR valve 54 to the fully open position. The wastegate valve 26 may be in a number of positions. This occurs while the engine 12 is on and producing exhaust gas to be recirculated. The controller 70 also operates the e-turbo assembly 18 normally, and the heating element(s) 52 are deactivated.

In this mode, the compressor 22 is rotated such that air in the air intake conduit 30 is compressed, and the engine system 10 actuators (e.g., cams, wastegate spark, turbine, throttle, valves, etc.) are controlled to create a pressure differential such that the exhaust gases will flow from the exhaust manifold 64 into recirculation passage 50. It will be appreciated that various actuators/operations may be performed to create the desired pressure differential. Because the throttle 38 is open and the engine 12 is running, the compressed air is drawn through the CAC 36 and into the engine 12, as shown by the arrows. Because the preheat/EGR valve 54 is open, exhaust gas exiting the engine 12 is drawn into the recirculation passage 50, through the EGR cooler 56 (if present), and returned to the air intake conduit 30 downstream of the compressor 22.

Figure 3:
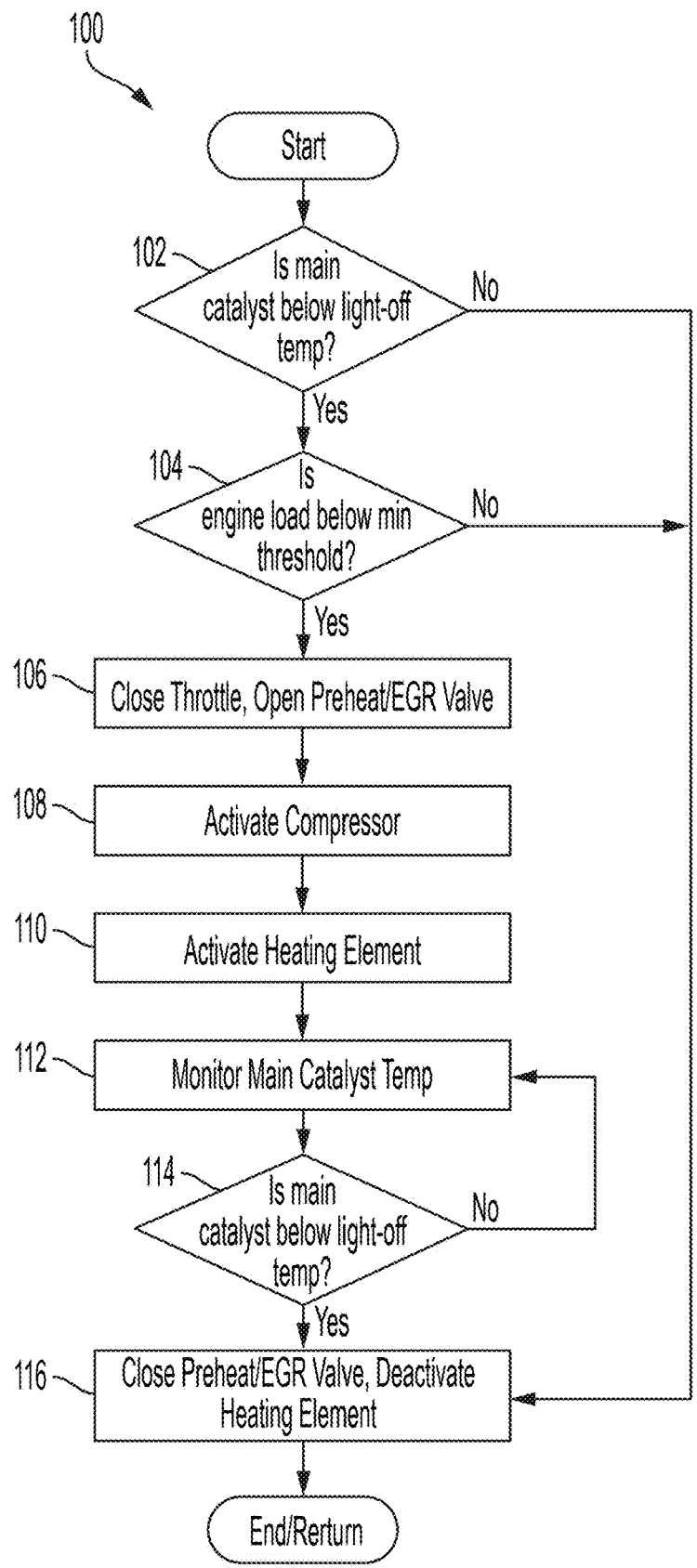
FIG. 3 is a flow control diagram of an example method of operating the combined catalyst preheating/EGR system shown in FIG. 1, in accordance with the principles of the present application.

With reference now to FIG. 3, a flow diagram of an example method 100 of operating engine system 10 in the catalyst preheat mode is illustrated in accordance with the principles of the present application. At step 102, controller 70 ("control") determines if the main catalyst 44 is below a predetermined light-off temperature. If no, control proceeds to step 116. If yes, control proceeds to step 104 and determines if an engine load is below a minimum threshold (e.g., off, or a load/flow the recirculation passage 50 can handle). If no, control proceeds to step 116. If yes, control proceeds to step 106, closes throttle 38, and opens the wastegate valve 26 and preheat/EGR valve 54. At step 108, control activates compressor 22 to draw air into the air intake conduit 30 and allow intake air through the recirculation passage 50. At step 110, control activates the heating element(s) 52 to heat the intake air passing therethrough.

At step 112, control monitors the temperature of the main catalyst 44, and/or exhaust gas flowing through the recirculation passage 50 or main exhaust conduit 42. At step 114, control determines if the main catalyst 44 and/or exhaust gas flowing through the main exhaust conduit 42 have reached the predetermined light-off temperature of the main catalyst 44. If no, control returns to step 112. In some scenarios, the engine 12 may be turned on prior to reaching the light-off temperature, in which case the throttle 38 is opened, but the heating element(s) 52 may continue to provide heating to intake air/exhaust. If yes, control proceeds to step 116 and returns the exhaust system 16 to a normal operation by closing preheating/EGR valve 54, deactivating the heating element(s) 52, and operating the wastegate valve 26, throttle 38, and e-turbo assembly 18 in a normal manner. Control then ends or returns to step 102.

Figure 4:
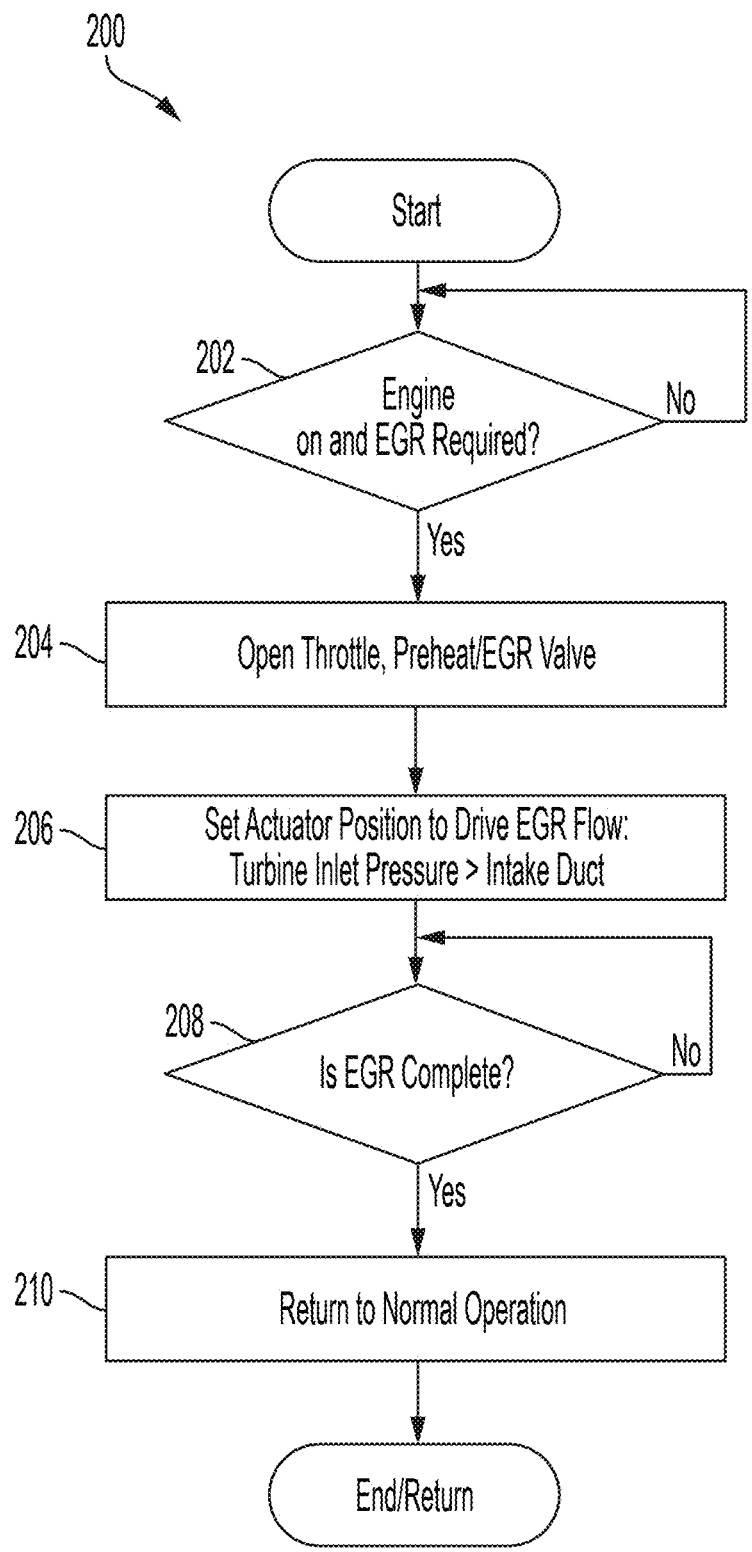
FIG. 4 is a flow control diagram of an example method of operating the combined catalyst preheating/EGR system shown in FIG. 2, in accordance with the principles of the present application.

With reference now to FIG. 4, a flow diagram of an example method 200 of operating engine system 10 in the EGR mode is illustrated in accordance with the principles of the present application. At step 202, controller 70 ("control") determines if the engine 12 is running and an EGR mode is required or requested by a system of the vehicle. If no, control returns to step 202. If yes, control proceeds to step 204 and at least partially opens the preheat/EGR valve 54 and the throttle 38. Wastegate valve 26 may be opened or closed. At 206, the compressor 22 is rotated (e.g., via motor or turbine) to draw air into the air intake conduit 30 and direct intake air to the engine 12. Because preheat/EGR valve 54 is open, at least a portion of the exhaust gas exiting the engine 12 is drawn into the recirculation passage 50 and returned to the air intake conduit 30. At 208, control determines if the EGR operation is complete. If no, control returns to 208. If yes, control proceeds to 210 and returns the exhaust system 16 to a normal operation by closing preheating/EGR valve 54, and operating the wastegate valve 26, throttle 38, and e-turbo assembly 18 in a normal manner. Control then ends or returns to step 202.

Described herein are systems and methods for improving vehicle emissions systems efficiency, particularly during cold start, long idle, and low main catalyst temperature conditions. The system includes a combined catalyst preheating/EGR system with a recirculation passage. In a catalyst preheating mode, the recirculation passage receives intake air in a first direction, and heats the intake air with heating elements to rapidly warm a main catalyst to a light-off temperature. In an EGR mode, the recirculation passage receives exhaust gas in an opposite second direction to recirculate exhaust gas to the engine intake. The system advantageously utilizes a single recirculation passage to perform both catalyst preheating and EGR operations.

It will be appreciated that the term "controller" or "module" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

What is claimed is:

1. An internal combustion engine system for an electrified vehicle, the engine system comprising:
   an internal combustion engine;
   an air intake conduit configured to receive intake air;
   an exhaust system with a main exhaust conduit and a main catalytic converter configured to receive exhaust gas from the internal combustion engine;
   an electric turbocharger assembly including a compressor and a turbine rotatably coupled by a shaft;
   a combined catalyst preheating/exhaust gas recirculation (EGR) system with a recirculation passage, a heating element, and a preheating/EGR valve configured to selectively allow flow through the recirculation passage, wherein the recirculation passage includes a first end fluidly coupled to the air intake conduit in a location downstream of the compressor, and an opposite second end fluidly coupled to the main exhaust conduit in a location upstream of the turbine; and
   a controller having one or more processors and a non-transitory computer-readable storage medium having a plurality of instructions stored thereon, which, when executed by the one or more processors, cause the one or more processors to perform operations comprising:
   operating in a catalyst preheating mode, comprising:
      opening the preheating/EGR valve to allow intake air into the recirculation passage; and
      operating the electric turbocharger compressor to force intake air through the recirculation passage to the main exhaust conduit at the location upstream of the turbine, and through the heating element to rapidly heat the main catalytic converter to a predetermined light-off temperature; and
   operating in an EGR mode, comprising:
      opening a throttle to allow intake air to flow into the engine;
      opening the preheating/EGR valve to allow exhaust gas into the recirculation passage; and
      operating the internal combustion engine system to create a pressure differential to draw exhaust gas into the recirculation passage and recirculate the exhaust gas to the air intake conduit at the location downstream of the compressor.

2. The internal combustion engine system of claim 1, wherein the preheating/EGR valve is located at the recirculation passage first end.

3. The internal combustion engine system of claim 1, wherein in the catalyst preheating mode, the intake air flows through the recirculation passage in a first direction, and
   wherein in the EGR mode, the exhaust gas flows through the recirculation passage in a second direction that is opposite the first direction.

4. The internal combustion engine system of claim 1, wherein the electric turbocharger is powered by a battery system of the electrified vehicle.

5. The internal combustion engine system of claim 1, wherein the heating element is disposed within the recirculation passage.

6. The internal combustion engine system of claim 1, wherein the heating element is part of an electrically heated catalyst (EHC) disposed within the main exhaust conduit.

7. The internal combustion engine system of claim 1, wherein the heating element comprises:
   a first heating element disposed within the recirculation passage; and
   a second heating element disposed within the main exhaust conduit.

8. The internal combustion engine system of claim 1, wherein the catalyst preheating mode is performed while the engine is off.

9. The internal combustion engine system of claim 1, wherein the controller is further configured to operate in a normal operation mode, comprising:
   opening the throttle to allow intake air to flow into the engine;
   closing the preheating/EGR valve to prevent fluid flow into the recirculation passage; and
   operating the electric turbocharger assembly to compress intake air.

10. The internal combustion engine system of claim 1, further comprising a throttle disposed in the air intake conduit in a location downstream of the compressor.

11. A method of operating an internal combustion engine system that comprises:
   an internal combustion engine;
   an air intake conduit configured to receive intake air;
   an exhaust system with a main exhaust conduit and a main catalytic converter configured to receive exhaust gas from the internal combustion engine;
   an electric turbocharger assembly including a compressor and a turbine rotatably coupled by a shaft; and
   a combined catalyst preheating/exhaust gas recirculation (EGR) system with a recirculation passage, a heating element, and a preheating/EGR valve configured to selectively allow flow through the recirculation passage, wherein the recirculation passage includes a first end fluidly coupled to the air intake conduit in a location downstream of the compressor, and an opposite second end fluidly coupled to the main exhaust conduit in a location upstream of the turbine, the method comprising:
   operating in a catalyst preheating mode, comprising:
      opening, by a controller having one or more processors, the preheating/EGR valve to allow intake air into the recirculation passage; and
      operating, by the controller, the electric turbocharger compressor to force intake air through the recirculation passage to the main exhaust conduit at the location upstream of the turbine, and through the heating element to rapidly heat the main catalytic converter to a predetermined light-off temperature; and
   operating in an EGR mode, comprising:
      opening, by the controller, a throttle to allow intake air to flow into the engine;
      opening, by the controller, the preheating/EGR valve to allow exhaust gas into the recirculation passage; and
      operating the internal combustion engine system to create a pressure differential to draw exhaust gas into the recirculation passage and recirculate the exhaust gas to the air intake conduit at the location downstream of the compressor.

12. The method of claim 11, wherein the preheating/EGR valve is located at the recirculation passage first end.

13. The method of claim 11, wherein in the catalyst preheating mode, the intake air flows through the recirculation passage in a first direction, and wherein in the EGR mode, the exhaust gas flows through the recirculation passage in a second direction that is opposite the first direction.

14. The method of claim 11, wherein the electric turbocharger is powered by a battery system of the electrified vehicle.

15. The method of claim 11, wherein the heating element is disposed within the recirculation passage.

16. The method of claim 11, wherein the heating element is part of an electrically heated catalyst (EHC) disposed within the main exhaust conduit.

17. The method of claim 11, wherein the heating element comprises:
 a first heating element disposed within the recirculation passage; and
 a second heating element disposed within the main exhaust conduit.

18. The method of claim 11, wherein the catalyst preheating mode is performed while the engine is off.

19. The method of claim 11, further comprising operating in a normal operation mode, comprising:
 opening, by the controller, the throttle to allow intake air to flow into the engine;
 closing, by the controller, the preheating/EGR valve to prevent fluid flow into the recirculation passage; and
 operating the electric turbocharger assembly to compress intake air.

* * * * *